United States Patent
Trümper et al.

(10) Patent No.: US 9,903,672 B2
(45) Date of Patent: Feb. 27, 2018

(54) METHOD FOR OPERATING AN AIRCRAFT COOLING SYSTEM AND AIRCRAFT COOLING SYSTEM

(71) Applicant: AIRBUS OPERATIONS GMBH, Hamburg (DE)

(72) Inventors: Torsten Trümper, Hamburg (DE); Ahmet Kayihan Kiryaman, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 763 days.

(21) Appl. No.: 13/893,952

(22) Filed: May 14, 2013

(65) Prior Publication Data

US 2013/0319650 A1    Dec. 5, 2013

Related U.S. Application Data

(60) Provisional application No. 61/647,532, filed on May 16, 2012.

(30) Foreign Application Priority Data

May 16, 2012   (EP) ..................................... 12003868

(51) Int. Cl.
*G05D 23/00* (2006.01)
*F28F 27/00* (2006.01)
(Continued)

(52) U.S. Cl.
CPC .............. *F28F 27/00* (2013.01); *B64D 11/04* (2013.01); *B64D 13/06* (2013.01);
(Continued)

(58) Field of Classification Search
CPC ... F28F 27/00; B64D 13/08; B64D 2013/644; B64D 2013/0629; Y02T 50/56
See application file for complete search history.

(56) References Cited

U.S. PATENT DOCUMENTS 3,735,603 A * 5/1973 Hamilton ......................... 62/210
4,569,273 A * 2/1986 Anderson et al. ............... 91/447
(Continued)

FOREIGN PATENT DOCUMENTS

CN    1902086    1/2007
CN   101005987   7/2007
(Continued)

OTHER PUBLICATIONS

A Combined Lookup Table and PI-type Controller for Temperature Control of Thermal Process Weerasak Tojang, Pittaya Pannil, Amphawan Chaikla, Prasit Julsereewong, and Kitti Tirasesth Faculty of Engineering, King Mongkut's Institute of Technology Ladkrabang; http://scl.hanyang.ac.kr/scl/database/papers/ICCAS/2003/papers/TE_07_06.pdf.*

*Primary Examiner* — Len Tran
*Assistant Examiner* — Gordon Jones
(74) *Attorney, Agent, or Firm* — Dickinson Wright PLLC

(57) ABSTRACT

In a method for operating an aircraft cooling system a cooling medium is guided through a cooling circuit, which is connected to a refrigerating machine and to at least one cooling station associated with a cooling energy consumer, to supply cooling medium cooled by the refrigerating to the cooling station. A temperature of the cooling medium upstream of the cooling station and a temperature of the cooling medium downstream of the cooling station are detected. The mass flow of cooling medium supplied to the cooling station is controlled in dependence on a thermal output of the cooling energy consumer and in dependence on a difference between the temperature of the cooling medium upstream of the cooling station and the temperature of the cooling medium downstream of the cooling station.

10 Claims, 1 Drawing Sheet

(51) Int. Cl.
  *B64D 11/04* (2006.01)
  *B64D 13/06* (2006.01)
(52) U.S. Cl.
  CPC ............ *B64D 2013/0614* (2013.01); *B64D 2013/0629* (2013.01); *Y02T 50/56* (2013.01)

(56) References Cited

U.S. PATENT DOCUMENTS

| | | | |
|---|---|---|---|
| 5,513,500 A | 5/1996 | Fischer | |
| 5,691,466 A * | 11/1997 | Lawrence et al. | ........... 73/29.05 |
| 6,647,734 B2 * | 11/2003 | Cho | ........ F25D 17/065 |
| | | | 454/193 |
| 6,845,627 B1 * | 1/2005 | Buck | ............... 62/185 |
| 6,948,331 B1 | 9/2005 | Ho | |
| 7,784,289 B2 | 8/2010 | Scherer | |
| 8,887,517 B2 * | 11/2014 | Truemper | ............ 62/126 |
| 2004/0068996 A1 | 4/2004 | Tseng | |
| 2004/0159118 A1 | 8/2004 | Hu | |
| 2005/0061012 A1 | 3/2005 | Zywiak | |
| 2005/0199839 A1 * | 9/2005 | Vincent et al. | ........... 251/30.01 |
| 2007/0267060 A1 | 11/2007 | Scherer | |
| 2008/0174789 A1 | 7/2008 | Uffenkamp | |
| 2009/0000329 A1 | 1/2009 | Colberg | |
| 2010/0071384 A1 | 3/2010 | Lu | |
| 2010/0242491 A1 * | 9/2010 | Davis et al. | .................... 60/782 |
| 2010/0251737 A1 | 10/2010 | Roering | |
| 2010/0251797 A1 | 10/2010 | Sperrer | |
| 2010/0281892 A1 | 11/2010 | Schroder | |
| 2011/0067838 A1 * | 3/2011 | Soenmez | ............. A47F 3/0408 |
| | | | 165/104.11 |
| 2012/0000220 A1 | 1/2012 | Altay | |
| 2012/0064816 A1 | 3/2012 | Krakowski | |

FOREIGN PATENT DOCUMENTS

| | | |
|---|---|---|
| CN | 102159459 | 8/2011 |
| CN | 102202969 | 9/2011 |
| DE | 43 40 317 | 6/1995 |
| DE | 10 2006 005 035 | 9/2007 |
| DE | 10 2009 011 797 | 9/2010 |
| DE | 10 2009 030 743 | 12/2010 |
| EP | 2 251 260 | 11/2010 |
| WO | 2007/080012 | 7/2007 |

* cited by examiner

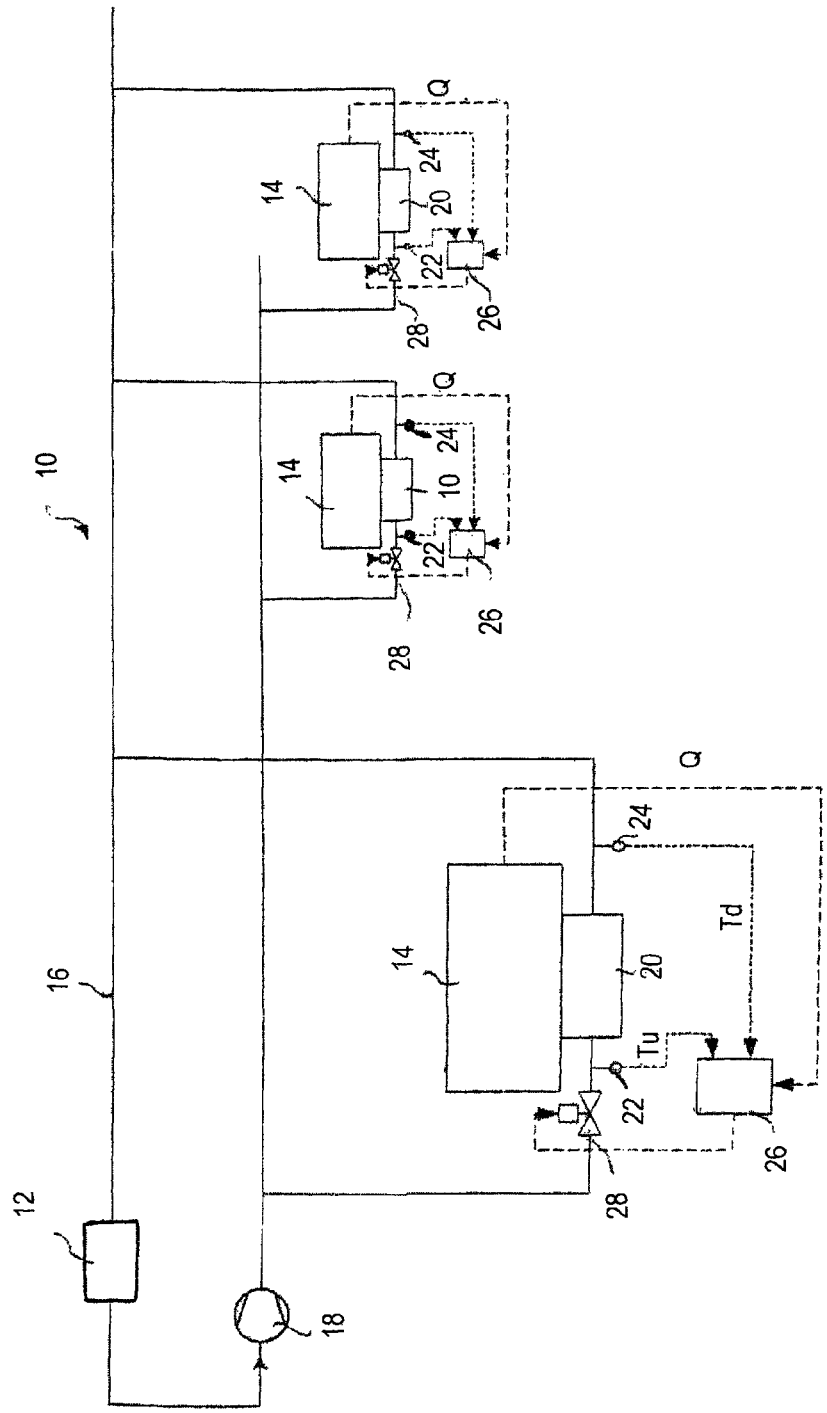

METHOD FOR OPERATING AN AIRCRAFT COOLING SYSTEM AND AIRCRAFT COOLING SYSTEM

CROSS REFERENCE TO RELATED APPLICATIONS

This application is entitled to and claims the benefit of European Application No. EP 12003868.2 filed May 16, 2012 and U.S. Provisional Application No. 61/647,532, filed May 16, 2012, the disclosures of each of which, including the specification, claims, drawings and abstract, are incorporated herein by reference in their entirety.

FIELD

The invention concerns a method for operating an aircraft cooling system and an aircraft cooling system, the aircraft cooling system being, in particular, an aircraft liquid cooling system used, for example, for cooling electronic components on board the aircraft.

BACKGROUND

In modern aircraft, liquid cooling systems are increasingly used to supply cooling energy to the cooling energy consumers which are present on board the aircraft, for example, food or heat-generating components, such as electronic components. Aircraft liquid cooling systems as described, for example, in DE 43 40 317 C2, DE 10 2006 005 035 B3, WO 2007/080012 A1, DE 10 2009 011 797 A1 and US 2010/0251797 A1 comprise a central compression refrigerating machine whose refrigerating capacity is distributed via a cooling circuit, which is flown through by a suitable cooling medium, to a plurality of cooling stations. The cooling stations release the cooling energy provided by the central refrigerating machine to individual cooling energy consumers.

A nominal mass flow of cooling medium to be supplied to each of the cooling stations is determined in dependence on a nominal thermal output of the cooling energy consumer associated with the cooling station and in dependence on the temperature of the cooling medium supplied to the cooling station during normal operation of the cooling system. Specifically, the supply of a nominal mass flow of cooling medium having a predetermined temperature to each of the cooling stations ensures sufficient cooling of the respective cooling energy consumers associated with the cooling station and having a cooling energy requirement depending on the thermal output, i.e. the thermal output of the cooling energy consumers during normal operation.

The duct system of the aircraft cooling system usually is specifically designed in dependence on the type and the installation site of the cooling energy consumers to be supplied with cooling energy by the cooling system. In particular, the duct system, with the aid of time-consuming and thus costly simulations, is designed in such a way that each of the cooling stations associated with a respective cooling energy consumer is supplied with the nominal volume flow of cooling medium, irrespective of the position of the cooling station in the cooling circuit and hence the distance of the cooling station from a conveying device for conveying the cooling medium through the cooling circuit. Ducts connected to cooling stations disposed at a greater distance from the conveying device typically are required to have larger cross-sectional areas than ducts connected to cooling stations disposed close to the conveying device and thus increase the installation space requirement and the weight of the cooling system.

SUMMARY

The invention is directed to the object to provide a method for operating an aircraft cooling system and an aircraft cooling system, which simplify the design process employed for suitably dimensioning a duct system of the aircraft cooling system.

This problem is solved by a method for operating an aircraft cooling system according to features of attached claims and an aircraft cooling system according to features of attached claims.

In a method according to the invention for operating an aircraft cooling system, a cooling medium is guided through a cooling circuit, which is connected to a refrigerating machine and to at least one cooling station associated with a cooling energy consumer, to supply cooling medium cooled by the refrigerating machine to the cooling station and thus the cooling energy consumer. The refrigerating machine may be a central refrigerating machine, which supplies multiple cooling stations and thus multiple cooling energy consumers with cooling medium via the cooling circuit. Cooling energy may be transferred from the cooling circuit to a cooling energy consumer by means of a heat exchanger of the cooling station associated with the cooling energy consumer. As the cooling medium, a liquid cooling medium, e.g. water or Galden®, a gaseous cooling medium or a two-phase cooling medium may be used.

The method for operating an aircraft cooling system further comprises the steps of detecting a temperature of the cooling medium upstream of the cooling station and a temperature of the cooling medium downstream of the cooling station is detected. For example, a first temperature sensor may be employed for detecting the temperature of the cooling medium flowing through the cooling circuit upstream of the cooling station and a second temperature sensor may be employed for detecting the temperature of the cooling medium flowing through the cooling circuit downstream of the cooling station. The temperature signals provided by the temperature sensors may be transmitted to a control unit, preferably an electronic control unit.

In the method for operating an aircraft cooling system according to the invention the mass flow of cooling medium supplied to the cooling station is controlled in dependence on a thermal output of the cooling energy consumer and in dependence on a difference between the temperature of the cooling medium upstream of the cooling station and the temperature of the cooling medium downstream of the cooling station. For example, the control unit receiving the sensor signals indicative of the temperature of the cooling medium upstream of the cooling station and the temperature of the cooling medium downstream of the cooling station may determine the temperature difference, i.e. the temperature increase the cooling medium experiences upon flowing through the cooling station and thereby releasing its cooling energy to the cooling energy consumer, by comparing the temperature of the cooling medium upstream of the cooling station to the temperature of the cooling medium downstream of the cooling station. Further, the control unit may receive signals or use stored data indicative of the thermal output of the cooling energy consumer and then control the mass flow of cooling medium supplied to the cooling station is controlled in dependence on a thermal output of the cooling energy consumer and in dependence on the temperature difference of the cooling medium.

By controlling the mass flow of the cooling medium supplied to the cooling station in dependence on the thermal output of the cooling energy consumer and in dependence on the temperature difference of the cooling medium sufficient cooling of the cooling energy consumer can be ensured during all operational states of the cooling energy consumer and the cooling system, irrespective of the position of the cooling station associated with the cooling energy consumer in the cooling circuit, i.e. irrespective of a distance of the cooling station from a conveying device for conveying the cooling medium through the cooling circuit. Hence, upon designing an aircraft cooling system which is operable in accordance with the method according to the invention time and cost intensive simulations of the duct system can be dispensed with. The design process employed for suitably dimensioning the duct system of the aircraft cooling system thus is significantly simplified.

Further, in an aircraft cooling system which is operable in accordance with the method according to the invention the supply of cooling medium and thus cooling energy to the cooling station is individually controlled in dependence on the cooling energy requirement of the cooling energy consumer associated with the cooling station. Thus, it is no longer necessary to employ ducts having large cross-sectional areas in the cooling circuit for ensuring that cooling stations which are disposed distant from a conveying device for conveying the cooling medium through the cooling circuit are supplied with a sufficient mass flow of cooling medium. As a result, the installation space requirement and the weight of the cooling system can be reduced.

The mass flow of cooling medium supplied to the cooling station may be controlled in dependence on a nominal value of the thermal output of the cooling energy consumer. The nominal value of the thermal output of the cooling energy consumer is defined as the value of the thermal output of the cooling energy consumer during normal operation. In case the cooling energy consumer is an electronic component, the nominal value of the thermal output typically is known or at least easy to determine. A control of the mass flow of the cooling medium supplied to the cooling station in dependence on a constant nominal value of the thermal output of the cooling energy consumer thus is particularly easy to implement.

It is, however, also conceivable to control the mass flow of cooling medium supplied to the cooling station in dependence on a varying detected or calculated value of the thermal output of the cooling energy consumer. In particular, the thermal output of the cooling energy consumer may be actually measured by a suitable sensor or calculated based on the operational state of the cooling energy consumer. For example, the mass flow of cooling medium supplied to the cooling station may be increased during an operational state of the cooling energy consumer during which the cooling energy consumer is operated under a high load and thus has a high thermal output. Similarly, the mass flow of cooling medium supplied to the cooling station may be decreased during an operational state of the cooling energy consumer during which the cooling energy consumer is operated under a low load and thus has a low thermal output.

By considering the actual thermal output of the cooling energy consumer upon controlling the mass flow of cooling medium supplied to the cooling station the cooling energy supply to the cooling energy consumer may be optimized, i.e. the overall mass flow of cooling medium supplied to the cooling station may be minimized while still ensuring sufficient cooling of the cooling energy consumer. As a result, the overall mass flow of cooling medium guided through the cooling circuit and thus the load of a conveying device conveying the cooling medium through the cooling circuit may be reduced. Hence, it is possible to employ a smaller conveying device or at least reduce wear of the conveying device during operation.

Finally, the control of the mass flow of cooling medium supplied to the cooling station in dependence on the thermal output of the cooling energy consumer also may be varied, e.g. in dependence on the operational state of the cooling system. In particular, during certain operational states of the cooling system the mass flow of cooling medium supplied to the cooling station may be controlled in dependence on a constant nominal value of the thermal output of the cooling energy consumer and during certain operational states of the cooling system the mass flow of cooling medium supplied to the cooling station is controlled in dependence on a varying detected or calculated value of the thermal output of the cooling energy consumer.

The mass flow of cooling medium supplied to the cooling station may be controlled such that the mass flow of the cooling medium does not exceed a nominal value. Preferably, the nominal value of the mass flow of cooling medium supplied to the cooling station is associated with the nominal value of the thermal output of the cooling energy consumer, i.e. the nominal value of the mass flow of the cooling medium supplied to the cooling station is defined as the value of the mass flow of cooling medium supplied to the cooling station which ensures sufficient cooling of the cooling energy consumer during normal operation of the cooling energy consumer during which the cooling energy consumer produces the nominal value of the thermal output. By restricting the mass flow of cooling medium supplied to the cooling station to a predetermined value the overall mass flow of cooling medium through the cooling circuit and thus the load of a conveying device for conveying the cooling medium through the cooling circuit may be reduced.

The temperature of the cooling medium upstream of the cooling station may be maintained constant during operation of the cooling system. This may be achieved by appropriately controlling the operation of the refrigerating machine such that the refrigerating machine cools the cooling medium circulating through the cooling circuit to a predetermined constant temperature. It is, however, also conceivable for the temperature of the cooling medium flowing through the cooling circuit upstream of the cooling station to vary, for example due to a variation of the operational state of the refrigerating machine, as it is described, for example in DE 10 2009 030 743 A1 and WO 2010/149267 A2. The mass flow of cooling medium supplied to the cooling station then may be controlled in dependence on a varying temperature of the cooling medium upstream of the cooling station.

Since in the method of operating an aircraft cooling system according to the invention the temperature difference between the temperature of the cooling medium upstream of the cooling station and the temperature of the cooling medium downstream of the cooling station is used as a control parameter for controlling the mass flow of cooling medium supplied to the cooling station, a variation of the temperature of the cooling medium upstream of the cooling station does not affect the control strategy. The method of operating an aircraft cooling system thus can also be employed in an aircraft cooling system, wherein the cooling energy output of the refrigerating machine is varied, e.g. to optimize the cooling performance and the energy efficiency of the cooling system.

The mass flow of cooling medium supplied to the cooling station may be controlled by means of a control valve which may, for example, be formed as a solenoid valve. Preferably, the control valve has a continuously variable flow cross-section which allows a particularly accurate control of the mass flow of cooling medium supplied to the cooling station.

The mass flow of cooling medium to be supplied to the cooling station may be calculated, e.g. by the electronic control unit, on demand based on the equation $$m = Q \Big/ \left( c \times \frac{x}{c} \times \Delta T \right)$$

wherein m is the mass flow of cooling medium supplied to the cooling station, c is the specific heat capacity of the cooling medium and $\Delta T$ is the temperature difference of the cooling medium, i.e. the difference between the temperature of the cooling medium upstream of the cooling station and the temperature of the cooling medium downstream of the cooling station. It is, however, also conceivable to determine the mass flow of cooling medium to be supplied to the cooling station based on a lookup table. The lookup table may be stored in the electronic control unit and may contain stored values of the thermal output of the cooling energy consumer, the temperature difference of the cooling medium, the specific heat capacity of the cooling medium and/or the mass flow of cooling medium to be supplied to the cooling station.

An aircraft cooling system according to the invention comprises a refrigerating machine and a cooling circuit, which is connected to the refrigerating machine and to at least one cooling station associated with a cooling energy consumer, and which is adapted to supply a cooling medium cooled by the refrigerating machine to the cooling station. The cooling system further comprises a detecting device which is adapted to detect a temperature of the cooling medium upstream of the cooling station and a temperature of the cooling medium downstream of the cooling station. Further, a control unit of the aircraft cooling system is adapted to control the mass flow of cooling medium supplied to the cooling station in dependence on a thermal output of the cooling energy consumer and in dependence on a difference between the temperature of the cooling medium upstream of the cooling station and the temperature of the cooling medium downstream of the cooling station.

The control unit may be adapted to control the mass flow of cooling medium supplied to the cooling station in dependence on a constant nominal value of the thermal output of the cooling energy consumer and/or in dependence on a varying detected or calculated value of the thermal output of the cooling energy consumer.

The control unit may be adapted to control the mass flow of cooling medium supplied to the cooling station such that that mass flow of cooling medium does not exceed a nominal value.

The control unit may be adapted to control the mass flow of cooling medium supplied to the cooling station in dependence on a varying temperature of the cooling medium upstream of the cooling station.

The control unit may further be adapted to control the mass flow of cooling medium supplied to the cooling station by means of a control valve. The control valve may have a continuously variable flow cross section.

Finally, the control unit may be adapted to determine the mass flow of cooling medium to be supplied to the cooling station based on a lookup table. The lookup table may contain stored values of the thermal output of the cooling energy consumer, the difference between the temperature of the cooling medium upstream of the cooling station and the temperature of the cooling medium downstream of the cooling station, the specific heat capacity of the cooling medium and/or the mass flow of cooling medium to be supplied to the cooling station.

BRIEF DESCRIPTION OF DRAWING

A preferred embodiment of the invention will now be explained in more detail with reference to the attached schematic drawing of FIG. 1, which shows an overview diagram of an aircraft cooling system.

DETAILED DESCRIPTION

An aircraft cooling system 10 shown in the FIGURE includes a central refrigerating machine 12, which supplies multiple cooling energy consumers 14 with cooling energy. The cooling energy consumers 14 may, for example, be electronic or electric components. The refrigerating machine 12 is connected thermally to a cooling circuit 16 of the aircraft cooling system 10. A liquid cooling medium, e.g. water, Galden® or another suitable cooling medium flows through the cooling circuit 16. To convey the liquid cooling medium through the cooling circuit 16, a conveying device 18 in the form of a pump is arranged in the cooling circuit 16.

The cooling energy is transferred from the cooling circuit 16 to the cooling energy consumers 14 by means of cooling stations 20. The cooling medium which is guided through the cooling circuit 16 flows through the cooling stations 20 which may, for example, comprise a heat exchanger which is thermally coupled to the individual cooling energy consumers 14 and thereby deliver cooling energy to the cooling energy consumers 14.

A first temperature sensor 22 is disposed in the cooling circuit 16 upstream of each cooling station 20. The first temperature sensor 22 serves to detect a temperature $T_u$ of the cooling medium flowing through the cooling circuit 16 upstream of the cooling station 20. A second temperature sensor 24 is disposed in the cooling circuit 10 downstream of each cooling station 20. The second temperature sensor 24 serves to detect a temperature $T_d$ of the cooling medium flowing through the cooling circuit 16 downstream of the cooling station 20. The first and the second temperature sensor 22, 24 transmit signals indicative of the temperature of the cooling medium upstream and downstream of the cooling station 20 to an electronic control unit 26.

Based on the signals provided by the temperature sensors 22, 24 the electronic control unit 26 determines a temperature difference $\Delta T$ between the temperature $T_u$ of the cooling medium upstream of the cooling station 20 and the temperature $T_d$ of the cooling medium downstream of the cooling station 20, i.e. the temperature increase the cooling medium experiences upon flowing through the cooling station 20 and thereby releasing its cooling energy to the cooling energy consumer 14 associated with the cooling station 20.

Further, the electronic control unit 26 is provided with a signal indicative of the thermal output Q of the cooling energy consumer 14. The electronic control unit 26 may be provided with a constant nominal value of the thermal output Q of the cooling energy consumer 14, wherein the nominal value of the thermal output Q of the cooling energy consumer 14 is defined as the value of the thermal output Q the cooling energy consumer 14 produces during normal operation. The constant nominal value of the thermal output Q of the cooling energy consumer 14 may be stored in the electronic control unit 26. The electronic control unit 16 may, however, also be provided with a signal indicative of a varying thermal output Q of the cooling energy consumer 14. The signal may be a signal which is directly indicative of the thermal output Q of the cooling energy consumer 14 or a signal indicative of the operational state of the cooling energy consumer 14 based on which the electronic control unit 16 may calculate the thermal output Q of the cooling energy consumer 14. It is, however, also conceivable that the electronic control unit 26 is provided with both, a constant nominal value of the thermal output Q of the cooling energy consumer 14 and a signal indicative of a varying thermal output Q of the cooling energy consumer 14.

By suitably controlling a valve 28 which may, e.g., be formed as a solenoid valve, the electronic control unit 26 controls a mass flow m of cooling medium supplied to the cooling station 20 in dependence on the thermal output Q of the cooling energy consumer 14 and in dependence on the temperature difference ΔT of the cooling medium. The valve 28 has a continuously variable flow cross section and thus allows an accurate control of the mass flow in of cooling medium supplied to the cooling station.

Upon controlling the mass flow m of cooling medium supplied to the cooling station 20 the electronic control unit 26 may use a constant nominal value of the thermal output Q of the cooling energy consumer 14 or a varying detected or calculated value of the thermal output Q of the cooling energy consumer 14. It is, however, also conceivable that the electronic control unit 26 during certain operational states of the cooling system 10, upon controlling the mass flow m of cooling medium supplied to the cooling station 20, uses a constant nominal value of the thermal output Q of the cooling energy consumer 14 and during certain operational states of the cooling system 10 uses a varying detected or calculated value of the thermal output Q of the cooling energy consumer 14.

The electronic control unit 26, at least during certain operational states of the cooling system 10, controls the mass flow m of cooling medium supplied to the cooling station 20 in such a way that the mass flow m of cooling medium does not exceed a nominal value which is associated with the nominal value of the thermal output Q of the cooling energy consumer 14. During certain operational states of the cooling system 10 and/or the cooling energy consumer 14, e.g. during a high load operation of the cooling energy consumer 14 the electronic control unit 16 may, however, also allow the mass flow m of cooling medium supplied to the cooling station 20 to exceed the nominal value.

The refrigerating machine 12 may be operated such that the cooling medium flowing through the cooling circuit is cooled to a constant temperature. It is, however, also conceivable that the refrigerating machine 12, e.g. to optimize the cooling performance and the energy efficiency of the cooling system 10, is operated such that the temperature of the cooling medium flowing through the cooling circuit 16 upstream of the cooling station 20 varies. This does not affect control of the mass flow m of cooling medium supplied to the cooling station 20.

The mass flow m of cooling medium to be supplied to the cooling station may be calculated by the electronic control unit 26 on demand based on the equation $$m = Q \Big/ \left( c \times \frac{x}{c} \times \Delta T \right)$$

wherein m is the mass flow of cooling medium supplied to the cooling station, c is the specific heat capacity of the cooling medium and ΔT is the temperature difference of the cooling medium. The electronic control unit 26, however, may also use a lookup table for determining the mass flow m of cooling medium to be supplied to the cooling station. The lookup table may contain stored values of the thermal output Q of the cooling energy consumer 14, the temperature difference ΔT of the cooling medium, the specific heat capacity c of the cooling medium and/or the mass flow m of cooling medium to be supplied to the cooling station 20.

The invention claimed is:

1. A method for operating an aircraft cooling system, comprising the steps:
   cooling a cooling medium in a refrigerating machine,
   guiding the cooling medium exiting the refrigerating machine through a cooling circuit, which is connected to the refrigerating machine and to at least one cooling station associated with a cooling energy consumer, through a heat exchanger of the cooling system at the at least one cooling station to supply the cooling medium cooled by the refrigerating machine to the at least one cooling station,
   releasing cooling energy of the cooling medium via the heat exchanger of the at least one cooling station to the cooling energy consumer associated with the at least one cooling station, the heat exchanger being thermally coupled to the cooling energy consumer associated with the at least one cooling system station,
   detecting a temperature of the cooling medium cooled by and exiting the refrigerating machine upstream of the heat exchanger of the at least one cooling station and a temperature of the cooling medium downstream of the heat exchanger of the at least one cooling station,
   receiving a signal indicative of an actual thermal output of the cooling energy consumer, wherein the signal is indicative of at least one of (i) a first nominal value of the thermal output of the cooling energy consumer during the operation of the cooling energy consumer and (ii) a varying value of the thermal output of the cooling energy consumer measured by a sensor or calculated based on the operational state of the cooling energy consumer, and
   controlling the mass flow of the cooling medium supplied to the at least one cooling station (i) in dependence on the signal indicative of the actual thermal output of the cooling energy consumer and (ii) in dependence on a difference between the detected temperature of the cooling medium upstream of the heat exchanger of the at least one cooling station and the detected temperature of the cooling medium downstream of the heat exchanger of the at least one cooling station.

2. The method according to claim 1,
   wherein the mass flow of the cooling medium supplied to the at least one cooling station is controlled such that said mass flow of the cooling medium does not exceed a second nominal value which is associated with the first nominal value of the thermal output of the cooling energy consumer.

3. The method according to claim 1,
   wherein the mass flow of the cooling medium supplied to the at least one cooling station is controlled in dependence on a varying temperature of the cooling medium upstream of the at least one cooling station.

4. The method according to claim 1, wherein the mass flow of the cooling medium supplied to the at least one cooling station is controlled by means of a control valve having a continuously variable flow cross-section.

5. The method according to claim 1, wherein the mass flow of the cooling medium to be supplied to the at least one cooling station is determined based on a look-up table, said look-up table containing stored values of the thermal output of the cooling energy consumer, the difference between the temperature of the cooling medium upstream of the at least one cooling station and the temperature of the cooling medium downstream of the at least one cooling station, the specific heat capacity of the cooling medium and/or the mass flow of the cooling medium to be supplied to the at least one cooling station.

6. An aircraft cooling system with:
a refrigerating machine which is structured to cool a cooling medium,
a cooling circuit, which is connected to the refrigerating machine and to at least one cooling station associated with a cooling energy consumer, and which is structured to supply the cooling medium cooled by and exiting the refrigerating machine to a heat exchanger of the cooling system at the at least one cooling station, the at least one cooling station releasing cooling energy of the cooling medium to the cooling energy consumer associated with the at least one cooling station via the heat exchanger,
a detecting device which is structured to detect a temperature of the cooling medium cooled by and exiting the refrigerating machine upstream of the heat exchanger of the at least one cooling station,
a second detecting device which is structured to detect a temperature of the cooling medium downstream of the heat exchanger of the at least one cooling station,
a receiving device, which is structured to receive a signal indicative of an act y thermal output of the cooling energy consumer, wherein the signal is indicative of at least one of (i) a fin nominal value of the thermal output of the cooling energy consumer during normal operation of the cooling energy consumer and (ii) a varying value of the thermal output of the cooling energy consumer measured by a sensor or calculated based on the operational state of the cooling energy consumer, and
a control unit, which is structured to control the mass flow of the cooling medium supplied to the at least one cooling station (i) in dependence on the signal indicative of the actual thermal output of the cooling energy consumer and (ii) in dependence on a difference between the detected temperature of the cooling medium upstream of the heat exchanger of the at least one cooling station and the detected temperature of the cooling medium downstream of the heat exchanger of the at least one cooling station.

7. The system according to claim 6, wherein the control unit is structured to control the mass flow of the cooling medium supplied to the at least one cooling station such that said mass flow of the cooling medium does not exceed a second nominal value which is associated with the first nominal value of the thermal output of the cooling energy consumer.

8. The system according to claim 6, wherein the control unit is structured to control the mass flow of the cooling medium supplied to the at least one cooling station in dependence on a varying temperature of the cooling medium upstream of the at least one cooling station.

9. The system according to claim 6, wherein the control unit is structured to control the mass flow of it cooling medium supplied to the at least one cooling station by means of a control valve having a continuously variable flow cross-section.

10. The system according to claim 6, wherein the control unit is structured to determine the mass flow of the cooling medium to be supplied to the at least one cooling station based on a look-up table, said look-up table containing stored values of the thermal output of the cooling energy consumer, the difference between the temperature of the cooling medium upstream of the at least one cooling station and the temperature of the cooling medium downstream of the at least one cooling station and/or the mass flow of the cooling medium to be supplied to the at east one cooling station.

* * * * *